United States Patent
Bommana et al.

(10) Patent No.: US 11,150,842 B1
(45) Date of Patent: Oct. 19, 2021

(54) DYNAMIC MEMORY CONTROLLER AND METHOD FOR USE THEREWITH

(71) Applicant: Western Digital Technologies, Inc., San Jose, CA (US)

(72) Inventors: Sesibhushana Rao Bommana, Telangana (IN); Mukesh Panda, Odisha (IN)

(73) Assignee: Western Digital Technologies, Inc., San Jose, CA (US)

( * ) Notice: Subject to any disclaimer, the term of this patent is extended or adjusted under 35 U.S.C. 154(b) by 51 days.

(21) Appl. No.: 16/853,233

(22) Filed: Apr. 20, 2020

(51) Int. Cl.
G06F 3/06 (2006.01)
G06F 1/08 (2006.01)
G06F 1/00 (2006.01)
G06F 11/10 (2006.01)

(52) U.S. Cl.
CPC .............. *G06F 3/0659* (2013.01); *G06F 1/08* (2013.01); *G06F 3/0604* (2013.01); *G06F 3/0673* (2013.01); *G06F 11/1076* (2013.01)

(58) Field of Classification Search
CPC ........ G06F 3/0659; G06F 1/08; G06F 3/0604; G06F 3/0673; G06F 11/1076
See application file for complete search history.

(56) References Cited

U.S. PATENT DOCUMENTS

| | | | |
|---|---|---|---|
| 8,151,037 B1 | 4/2012 | Zhou et al. | |
| 8,478,916 B2 | 7/2013 | Asnaashari | |
| 8,589,723 B2 | 11/2013 | Kumar et al. | |
| 8,874,820 B2 | 10/2014 | Oh et al. | |
| 10,452,596 B2* | 10/2019 | Carey | G06F 13/4282 |
| 2003/0110340 A1* | 6/2003 | Butler | G06F 13/4226 710/305 |
| 2004/0083285 A1* | 4/2004 | Nicolson | H04L 41/046 709/224 |
| 2004/0083308 A1* | 4/2004 | Sebastian | H04L 69/12 709/248 |
| 2010/0023669 A1 | 1/2010 | Lee | |
| 2010/0185808 A1 | 7/2010 | Yu et al. | |
| 2011/0040924 A1* | 2/2011 | Selinger | G06F 11/10 711/103 |
| 2012/0128107 A1* | 5/2012 | Oren | H04B 15/06 375/344 |

(Continued)

FOREIGN PATENT DOCUMENTS

CN 203224819 U 10/2013
CN 107092570 A 8/2017

(Continued)

OTHER PUBLICATIONS

U.S. Appl. No. 16/910,869, filed Jun. 23, 2020, entitled "Dual-Interface Storage System and Method for Use Therewith".

(Continued)

*Primary Examiner* — Kyle Vallecillo
(74) *Attorney, Agent, or Firm* — Crowell & Moring LLP

(57) ABSTRACT

A dynamic memory controller and method for use therewith are provided. In one example, a memory controller comprises dynamically-programmable components that can be used to configure the memory controller to be used with any number of selected host and/or memory types, as well as to enable the memory controller with different error detection/correction functionality.

20 Claims, 6 Drawing Sheets

(56) References Cited

U.S. PATENT DOCUMENTS

| | | | | |
|---|---|---|---|---|
| 2012/0260007 A1* | 10/2012 | Jibbe | ............... | G06F 3/0625 |
| | | | | 710/33 |
| 2015/0154108 A1* | 6/2015 | Gorobets | ............ | G06F 12/0246 |
| | | | | 711/103 |
| 2016/0259597 A1 | 9/2016 | Worley et al. | | |
| 2016/0274803 A1* | 9/2016 | Earhart | ............... | G06F 3/0664 |
| 2016/0328347 A1* | 11/2016 | Worley | ............... | G06F 13/4282 |
| 2017/0123707 A1* | 5/2017 | Carey | ............... | G06F 13/4282 |
| 2018/0004688 A1* | 1/2018 | Chung | ............... | G06F 13/1673 |
| 2018/0113776 A1 | 4/2018 | Lee et al. | | |
| 2019/0138440 A1* | 5/2019 | Lee | ............... | G11C 16/08 |
| 2019/0146695 A1* | 5/2019 | Kim | ............... | G06F 3/0625 |
| | | | | 713/330 |
| 2019/0303147 A1* | 10/2019 | Brewer | ............... | G06F 15/7867 |
| 2021/0157525 A1* | 5/2021 | Seo | ............... | G06F 3/0679 |
| 2021/0157526 A1* | 5/2021 | Kwon | ............... | G11C 16/3418 |
| 2021/0173785 A1* | 6/2021 | Jin | ............... | G06F 12/0873 |
| 2021/0216469 A1* | 7/2021 | Park | ............... | G06F 12/10 |
| 2021/0243080 A1* | 8/2021 | Brewer | ............... | H04L 41/0816 |

FOREIGN PATENT DOCUMENTS

| | | |
|---|---|---|
| CN | 206557760 U | 10/2017 |
| WO | WO 2018233222 A1 | 12/2018 |

OTHER PUBLICATIONS

U.S. Appl. No. 17/178,447, filed Feb. 17, 2021, entitled "Storage System and Method for Dynamic Selection of a Host Interface".
International Search Report completed May 19, 2021 for International Application No. PCT/US2021/016522.
Written Opinion completed May 19, 2021 for International Application No. PCT/US2021/016522.
Israel Patent Office Search Strategy completed May 5, 2021 for International Application No. PCT/US2021/016522.
Non-final Office Action dated Apr. 9, 2021 for U.S. Appl. No. 16/910,869.

\* cited by examiner

DYNAMIC MEMORY CONTROLLER AND METHOD FOR USE THEREWITH

BACKGROUND

A memory controller in a storage system can be implemented as an application-specific integrated circuit (ASIC) and often has a memory interface for communicating with a memory of the storage system and a host interface for communicating with a host (e.g., for receiving read/write commands from the host and for receiving data from and sending data to the host). The memory interface and the host interface can be designed to work with a specific protocol or standard.

DETAILED DESCRIPTION

By way of introduction, the below embodiments relate to a dynamic memory controller and method for use therewith. In one embodiment, a memory controller is provided comprising fixed components (e.g., in an application-specific integrated circuit (ASIC)) and dynamically-programmable components (e.g., outside of the ASIC). The dynamically-programmable components can be used to configure the memory controller to be used with any number of selected host and/or memory types, as well as to enable the memory controller with different error detection/correction functionality. The dynamically-programmable components can be used to provide the memory controller with other types of functionality. Other embodiments are possible, and each of the embodiments can be used alone or together in combination. Accordingly, various embodiments will now be described with reference to the attached drawings.

Figure 1A:
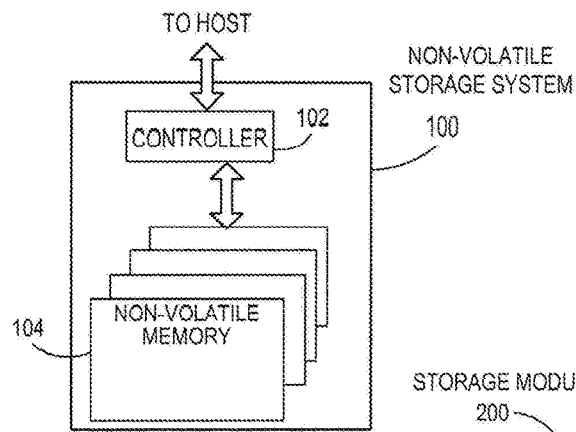
FIG. 1A is a block diagram of a non-volatile storage system of an embodiment.
Figure 1B:
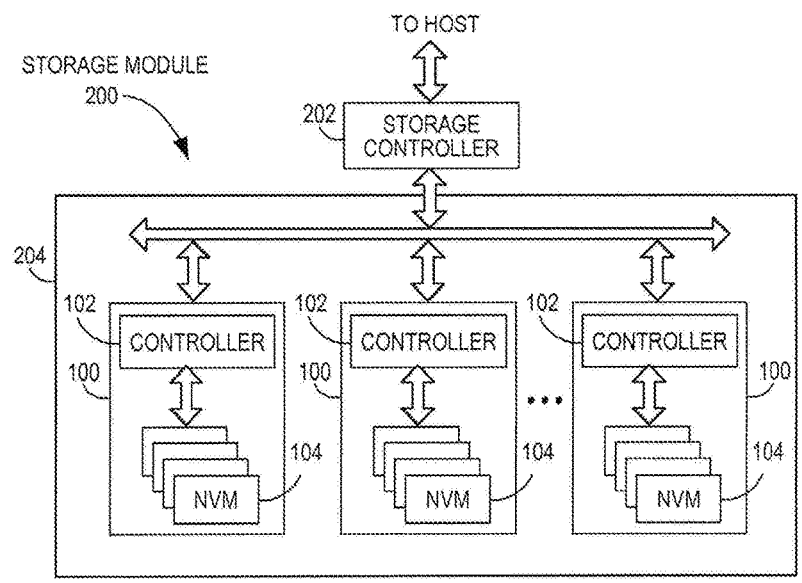
FIG. 1B is a block diagram illustrating a storage module of an embodiment.
Figure 1C:
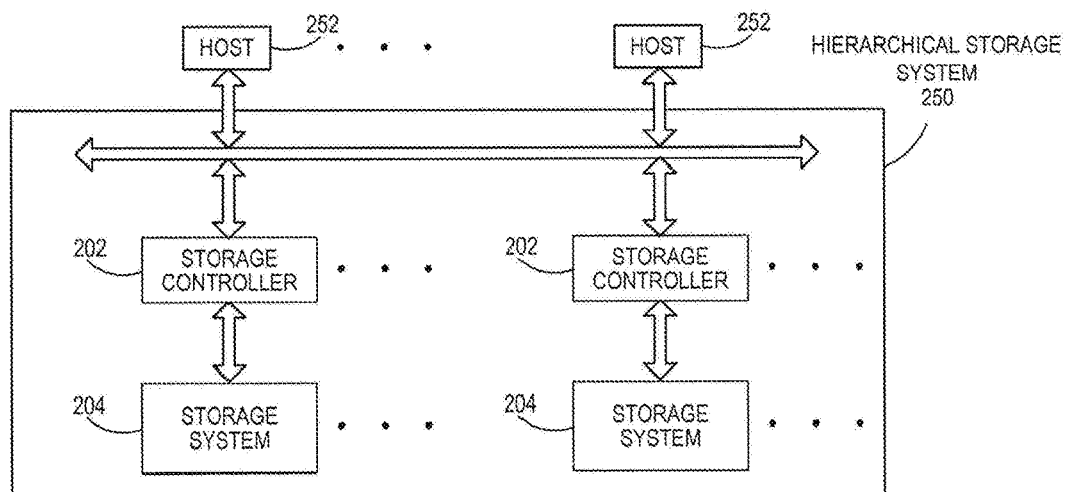
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2:
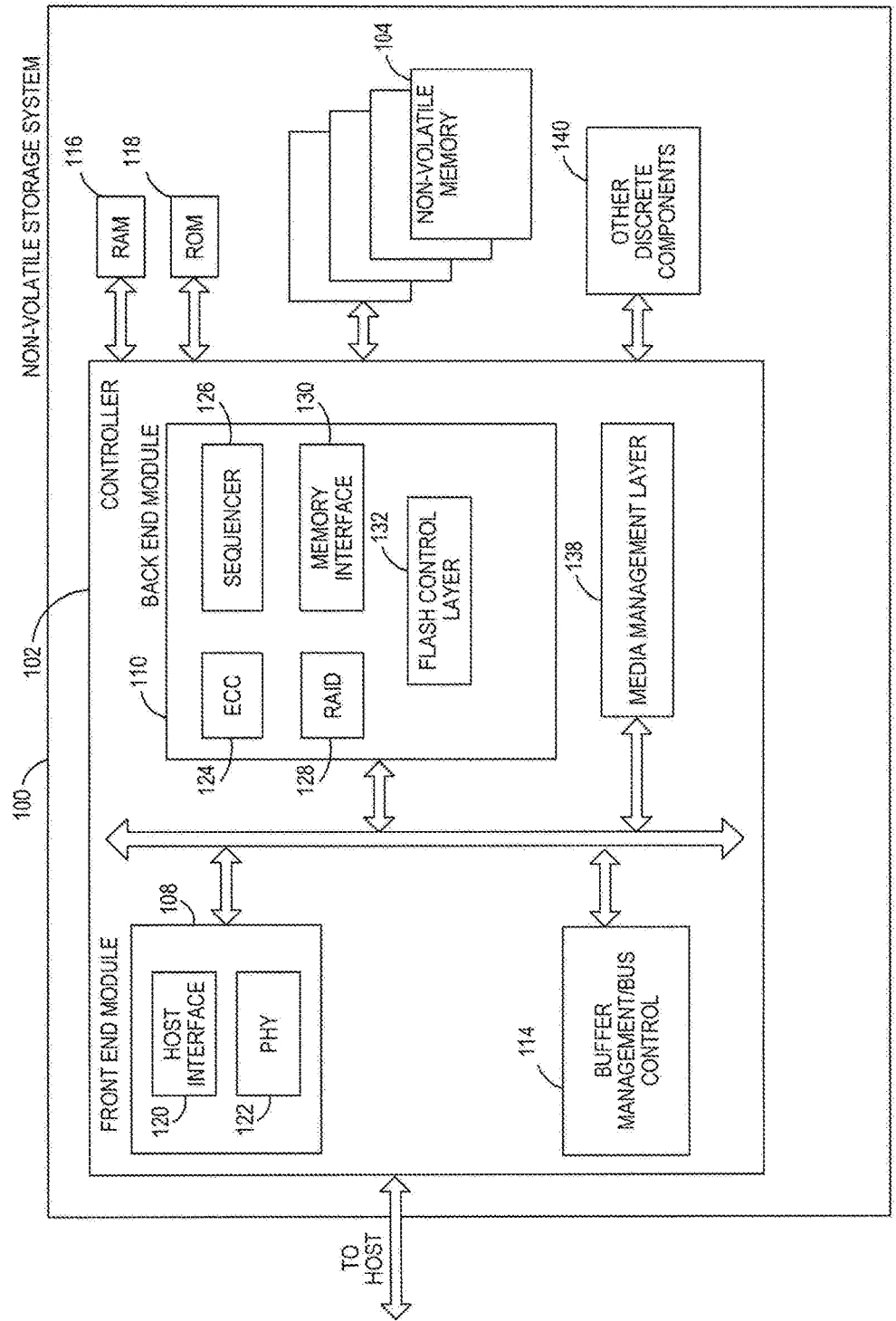
FIG. 2 is a block diagram illustrating components of the controller of the non-volatile storage system illustrated in FIG. 1A according to an embodiment.

FIG. 2 is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2 as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 3:
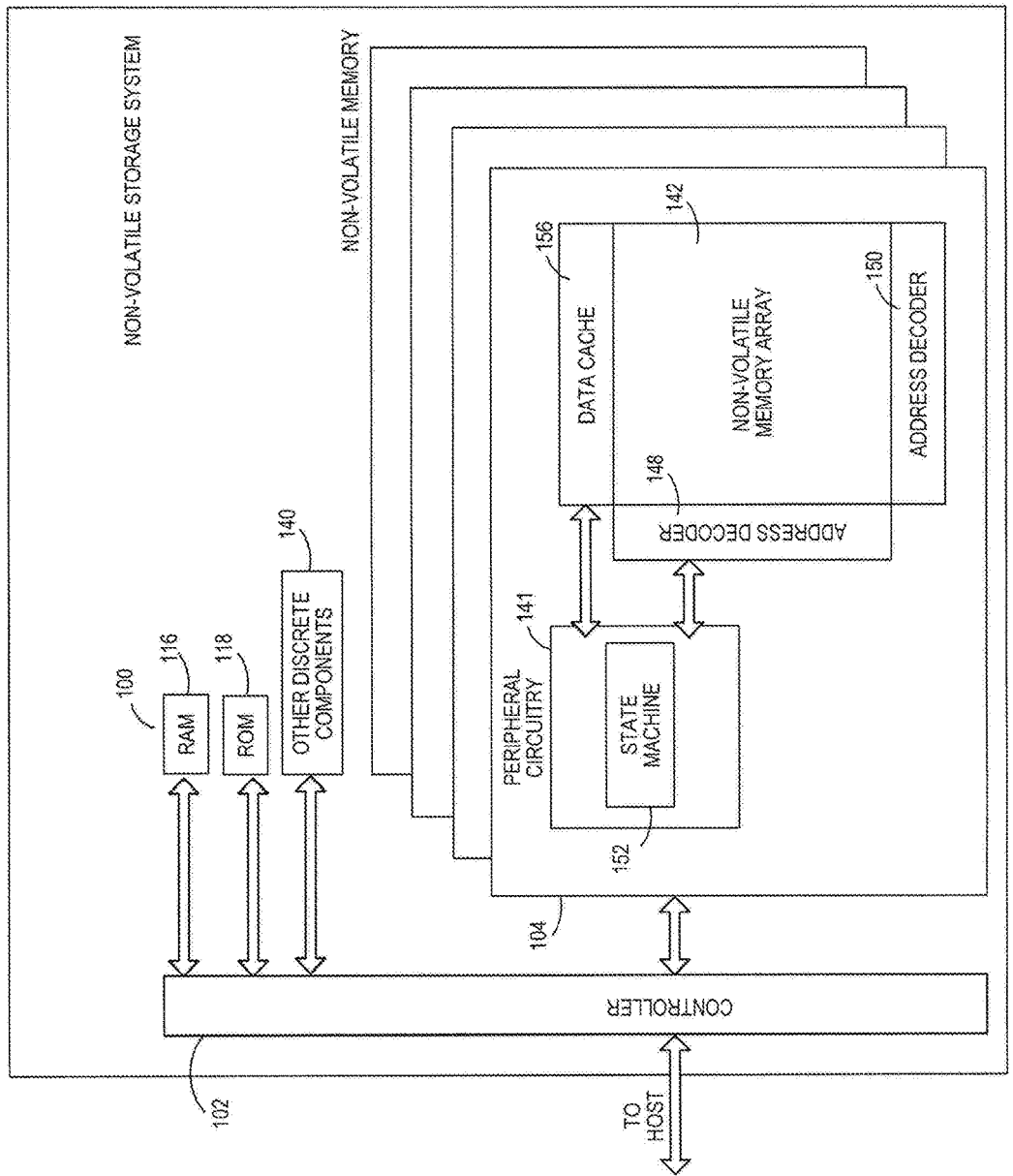
FIG. 3 is a block diagram illustrating components of the non-volatile storage system illustrated in FIG. 1A according to an embodiment.

FIG. 3 is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

If the controller 102 is implemented as an application-specific integrated circuit (ASIC), all of its components are static. For example, because the memory interface 130 (sometimes referred to herein as the flash interface module (FIM) when the memory 104 is NAND flash memory) can only support a fixed number FIM channels, the controller 102 can only work with memory having that number of channels. If more channels are desired to increase the capacity of the memory 104 or the performance of the storage system 100, the controller ASIC would need to be redesigned to support the increased number of channels. A similar problem can occur with the host interface 120. Because the host interface 120 (sometimes referred to herein as the host interface module (HIM)) is also static, the controller ASIC would need to be redesigned if the controller 102 is to be used with a host having a different interface (e.g., UFS, USB, PCIe, SD, SATA, or NVMe). So, a number of controller ASICs may need to be designed for each product or product line, as a single controller ASIC will not work for all the products and their different interfaces. Further, a new controller ASIC would be needed if a new memory technology is developed that is not supported by the controller. Redesigning the controller ASIC is a non-trivial task and can require a large amount of design resources and other inventory, which can increase the expense of the controller 102 and delay its delivery to market.

Figure 4:
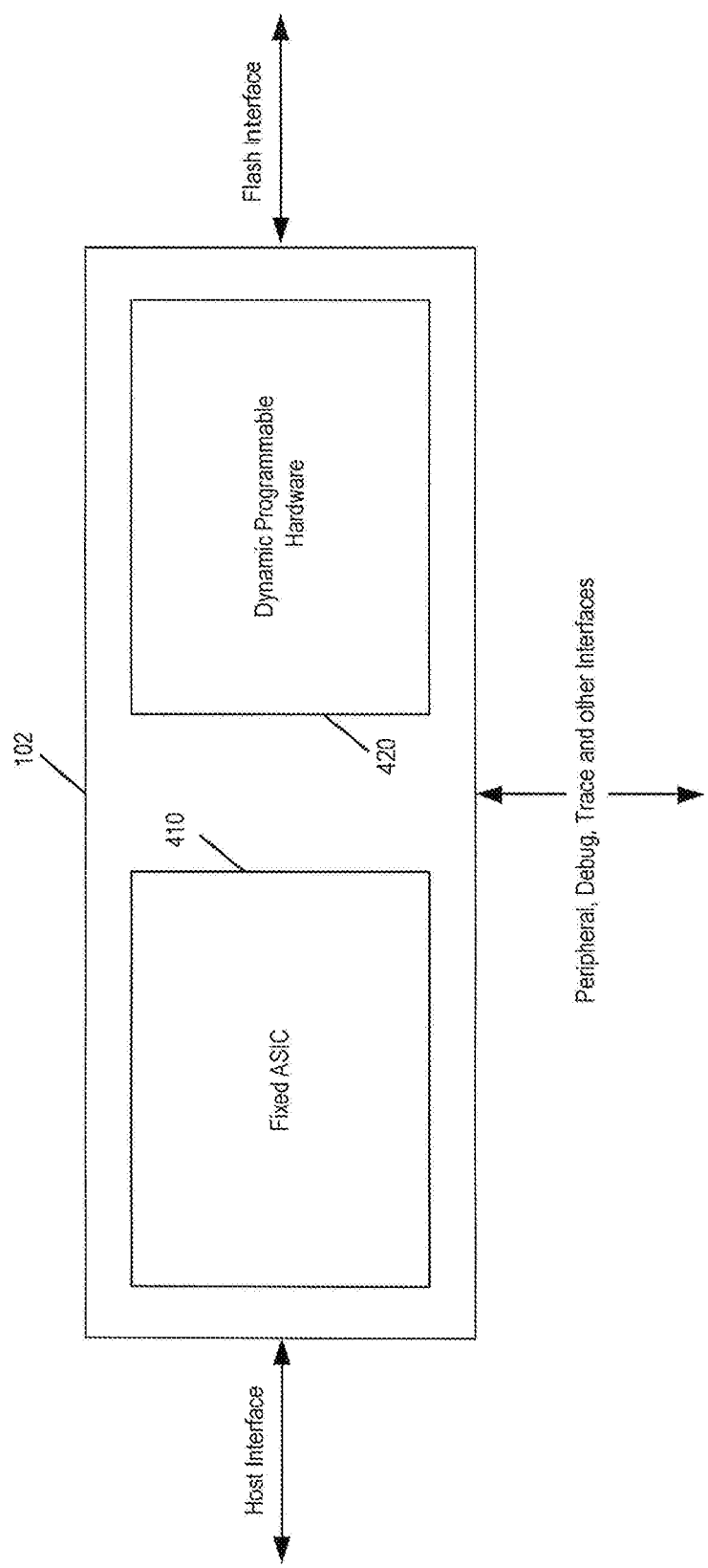
FIG. 4 is a block diagram of a controller of an embodiment.

To address this issue, one embodiment provides a single controller 102 that can shared across products and be flexible enough to adapt to new memory technologies. As shown in FIG. 4, the controller 102 in this embodiment comprises fixed hardware components 410 (e.g., components whose basic functionality is not configurable after manufacture) which can be implemented in an ASIC and dynamically-programmable hardware components 420 which can be implemented with registers that dynamically configure the functionality of the components. Because this controller 102 is dynamic in nature, a product team can provide a single controller design to be used with various host and memory products and provide updated configuration files to the controller 102 as needed. This will enable product teams to be able to configure the controller 102 for the end-product requirements and quickly ship the product to market with less expenditure than with conventional controller designs.

The dynamically-programmable hardware components 420 can be used to implement any desired functionality of the controller 102, such as, but not limited to, different host interfaces, different memory interfaces (e.g., FIM channels), different clock configurations, and different error corrections/detection mechanisms. The following paragraphs provide an example of one implementation. It should be understood that this is merely an example, and other implementations are possible.

Figure 5:
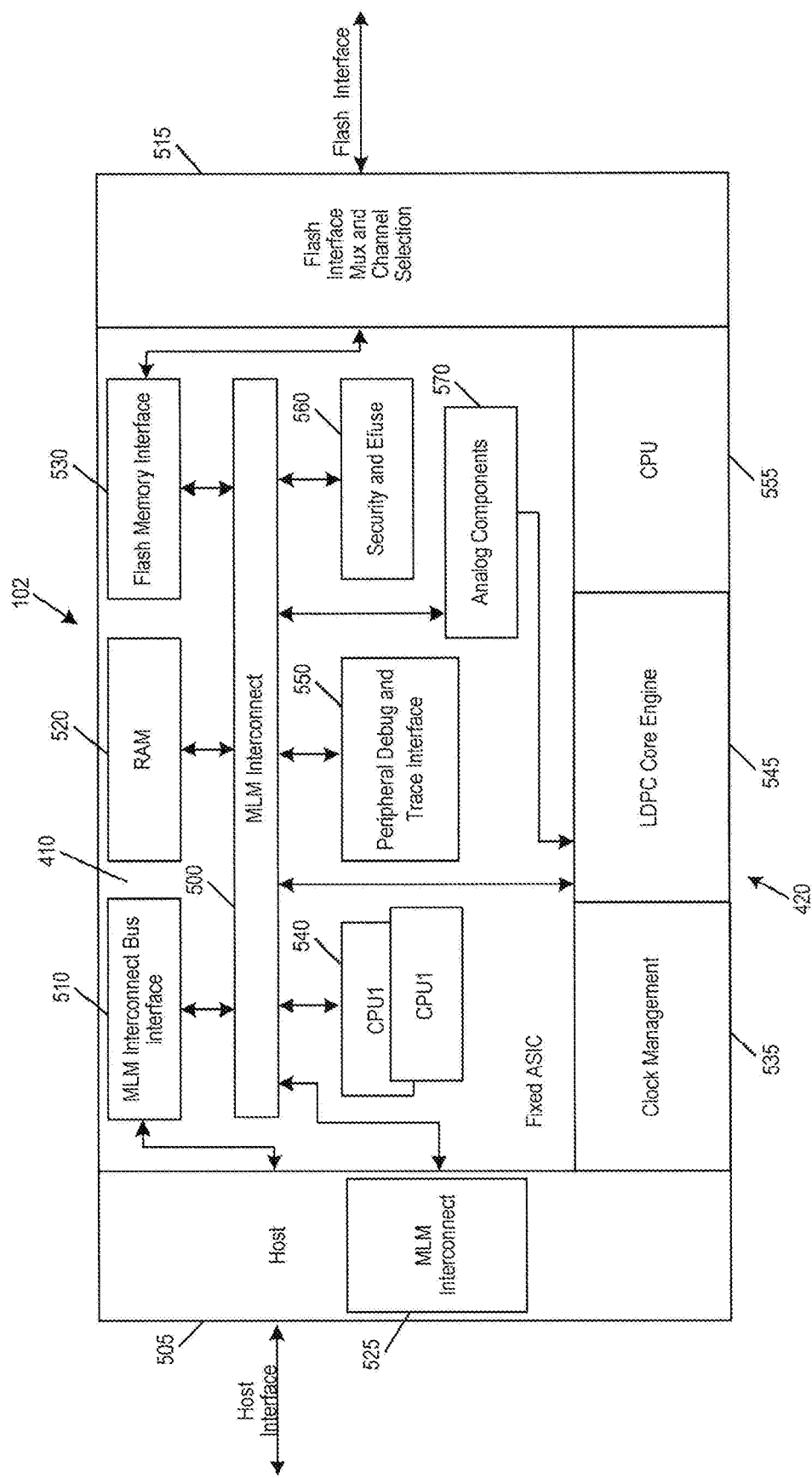
FIG. 5 is a block diagram of a controller of an embodiment with fixed and configurable hardware components.

Returning to the drawings, FIG. 5 is an illustration of one example implementation of a controller 102 of an embodiment. As shown in FIG. 5, this controller 102 has fixed hardware components 410 and dynamically-programmable hardware components 420. In this example, the fixed hardware components 410 comprise a multi-layer matrix (MLM) interconnect 500 that is in communication with a MLM interconnect bus interface 510, RAM 520, a flash memory interface 530, one or more processors (here, central processing units (CPUs 1 and 2) 540, a peripheral, debug, and trace interface 550, a security and electrical fuse (Efuse) module 570, and a set of (one or more) analog components 570.

The MLM interconnect 500 functions as a system bus to connect the various components in the fixed hardware components 410 section of the controller 102, as well as to a corresponding MLM interconnect 525 in the dynamically-programmable hardware components section 420 of the controller 102. The MLM interconnect 500 can perform various functions, such as logical-to-physical address translation and arbitration of commands from the processor(s) 540. The MLM interconnect bus interface 510 connects the MLM interconnect bus 500 to the host interface module 505 in the dynamically-programmable hardware components section 420 of the controller 102.

The RAM 520 can be used to store computer-readable program code read from the memory 104 and executed by the processor(s) 540. The RAM 520 can also be used to store data sent by the host to be written in the memory 104 and/or data read from the memory 104 to be sent to the host. The flash memory interface 530 connects to the flash interface multiplexor and channel selector 515 in the dynamically-programmable hardware components section 420 of the controller 102. The processor(s) 540 can execute computer-readable program code (e.g., read from the memory 104 and stored in the RAM 520).

The peripheral, debug, and trace interface 550 is an interface that connects to peripheral, debug, and trace components. Peripherals can take any suitable form, such as, but not limited to, a universal asynchronous receiver/transmitter (UART), a general-purpose input/output component (GPIO), a timer, a watchdog component, and a Joint Test Action Group (JTAP) component. In one embodiment, the peripherals can interrupt some or all of the processor(s) 545, 555 in the controller 102. The peripheral, debug, and trace interface 550 can also be used to debug firmware running on the processor(s) 540, as well as the processor(s) 545 in the dynamically-programmable hardware components section 420. The security and electrical fuse (Efuse) module 570 controls data safety. If a hack is detected, the fuse is blown, and the controller 102 is disabled. The analog components 570 can include, but are not limited to, a power supply controller, clock crystals, phase-locked loops (PLLs), and a switching architecture. The analog components 570 and the MLM interconnect 500 also communicate with an error detection/correction module (here, a low-density parity-check code (LDPC) module) 545 in the dynamically-programmable hardware components section 420 of the controller 102.

In one embodiment, the fixed hardware components 410 are part of the controller's ASIC. Because these components form the common logic of the controller 102, the fact that the functionality of these fixed components is not configurable is not an impediment to the flexibility of this controller 102. It should be noted that while the processor(s) 540 are in the fixed hardware components section 410 of the controller 102, the processor(s) 540 can be programmable with computer-readable program code.

Turning now to the dynamically-programmable hardware components section 420 of the controller 102, that section 420 comprises the host interface module 505, the flash interface multiplexor and channel selector 515 (which may be part of the overall memory interface module), the MLM interconnect 525, a clock management module 535, the LDPC core engine 545, and one or more processors (here, CPUs) 555. While FIG. 5 shows arrows illustrating communication between various components, it should be understood that additional communication channels can be present and are not shown in FIG. 5 to simplify the drawing.

The host interface module 505 is configured to provide an interface (e.g., USB, SD, PCie, SAT A, etc.) to a host, and the MLM interconnect module 525 is configured to provide an interface between the host interface module 505 and the MLM interconnect bus interface 510 in the fixed hardware component section 410 of the controller 102. The dock management module 535 is used to configure the analog components 570 for the required clock configurations of various modules. The LDPC engine 545 is used to provide error detection/correction functionality (e.g., encoding error bits for data to be stored in the memory 104 and decoding the error bits when the data is later read from the memory 104 to detect and possibly correct errors). The flash interface multiplexor and channel selector 515 is used to choose the number of flash interface channels to interface with the memory 104, which can enhance the storage capacity of the storage system 100. The flash interface multiplexor and channel selector 515 can also have high-end input-output modules to support the highest speed possible on the flash interface.

Each of these components comprises a register that can be programmed with values by the processor(s) 540 in the fixed hardware component section 410 of the controller 102 to alter the functionality of those components. In one embodiment the fixed hardware component section 410 of the controller 102 is implemented in an ASIC with 28 nm/16 nm nodes, and the dynamically-programmable hardware components section 420 of the controller 102 has 5 nm nodes. This can allow the controller 102 to support various product requirements for several years. In one embodiment, communication between the fixed hardware component section 410 of the controller 102 and the dynamically-programmable hardware components section 420 of the controller 102 happens over high-speed memory-mapped interfaces or streaming interfaces.

As mentioned above, the dynamically-programmable hardware components section 420 of the controller 102 also comprises one or more processors (here, CPUs) 555, which can communication with the processor(s) 540 in the fixed hardware component section 410 of the controller 102 for load sharing (e.g., the processor(s) 555 can take care of any additional load that not taken care by the processor(s) 540 in the fixed hardware component section 410 of the controller 102). All the processors 540, 555 can take any suitable form, such as, but not limited to, a reduced instruction set processor (RISC) or an Argonaut RISC (ARC) processor As noted above, various components in the dynamically-programmable hardware components section 420 of the controller 102 comprise registers that can be programmed with values by the processor(s) 540 in the fixed hardware component section 410 of the controller 102 to alter the functionality of those components and provide the flexibility noted above that conventional controllers do not have. The flow chart 600 in FIG. 6 and the following paragraphs provide an example of the dynamic reconfiguration capability of the controller 102 to implement different logic for different product requirements in the time-division domain. It should be noted that this is merely an example, and other implementations can be used.

Figure 6:
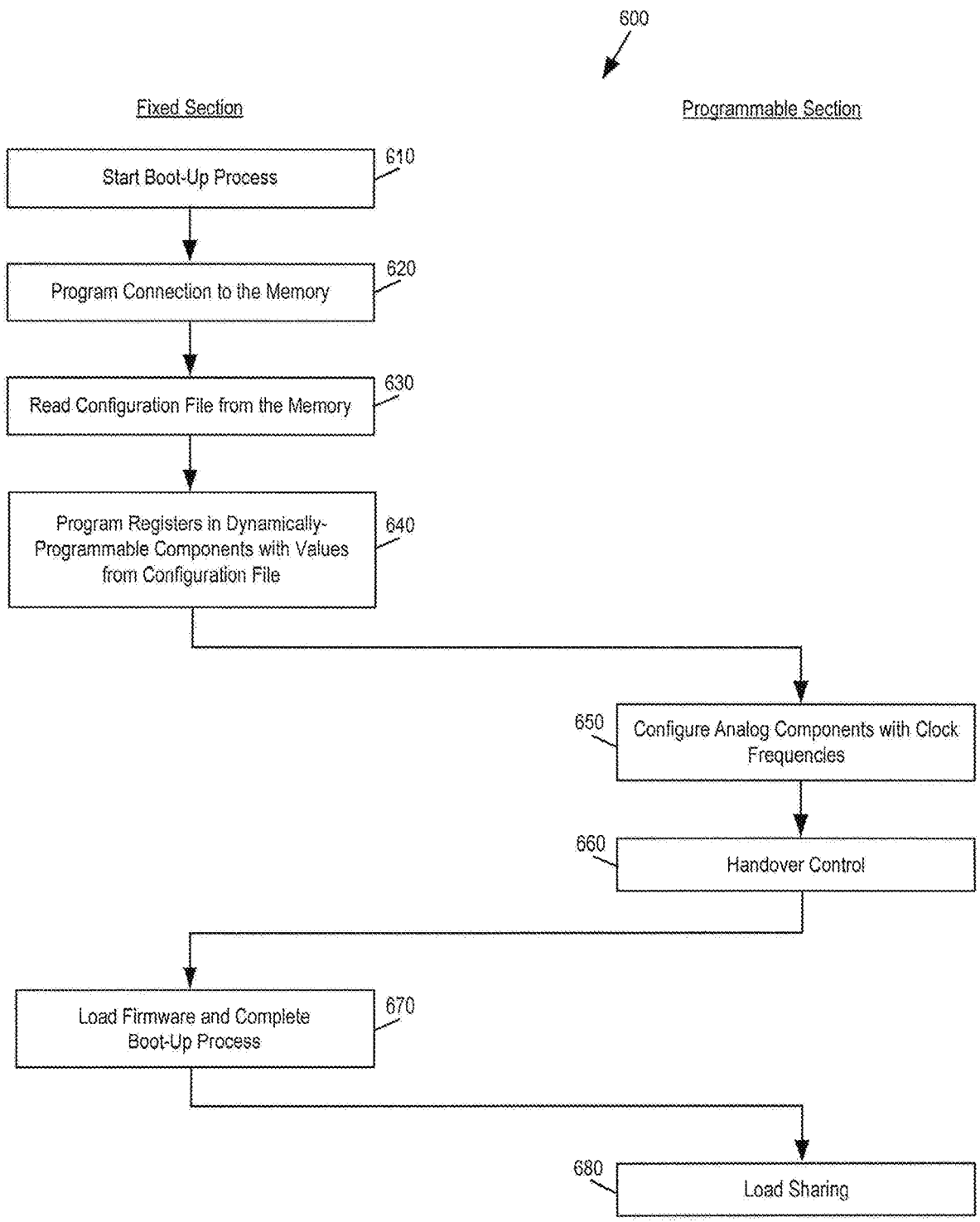
FIG. 6 is a flow chart of a method for using a controller of an embodiment.

As shown in FIG. 6, the processor(s) 540 in the fixed hardware component section 410 of the controller 102 initially load the RAM 520 with instruction code that the processor(s) 540 execute to boot up the controller 102 upon a power-on reset (POR) of the storage system 100 (act 610). The processor(s) 540 then program the flash interface multiplexor and channel selector 515 with a low-speed BM connection to the memory 104 (act 620). Next, using this established connection, the processor(s) 540 read a configuration file from the memory 104 and store it in RAM 520 (act 630). The configuration file stores values that can be programmed into the registers in the components in the dynamically-programmable hardware components section 420 of the controller 102.

With the configuration file, the processor(s) 540 program the registers in various ones of the components in the dynamically-programmable hardware components section 420 of the controller 102 (act 640). This enables the intended logic formed inside these programmable components. For example, the processor(s) 540 can write values specified in the configuration file to program the flash interface multiplexor and channel selector 515 to configure the controller 102 as a PCIe NAND controller with four FLM channels. The processor(s) 540 can also write values specified in the configuration file to program the host interface 505 as a USB host interface and program the MLM interconnect 525 accordingly. Further, the processor(s) 540 can write values specified in the configuration file to the LDPC engine 545 to configure that with certain error detection/correction functionality and to the clock management module 535 to configure that with the appropriate clock and timing values.

After the clock management module 535 is programmed with the appropriate values, the processor(s) 545 in the dynamically-programmable hardware components section 420 of the controller 102 configure the analog components 570 in the fixed hardware component section 410 of the controller 102 to provide the required clocks frequencies for the logic blocks in controller 102 (act 650). Next, the processor(s) 545 handover control to the processor(s) 540 in the fixed hardware component section 410 of the controller 102 (act 660), and those processor(s) 540 then load firmware from the memory 104 and complete the boot-up process (act 670).

Finally, the processor(s) 545 in the dynamically-programmable hardware components section 420 of the controller 102 can take on additional load from the processor(s) 540 in the fixed hardware component section 410 of the controller 102, as needed (act 680). In this way, the processor(s) 545 can provide a load-sharing capability.

There are several advantages associated with the embodiments. For example, these embodiments can allow a controller to be provided to market faster and less expensive, as the controller of this embodiment can be used with a wide variety of existing and future hosts and memories. Unlike a dedicated ASIC, the controller of these embodiments does not need to be redesigned for each host and memory product, as a single controller can be used with multiple products and port to new host and memory technologies. That is, the flexible solution of the dynamic reconfiguration of the programmable hardware components allows different logic to be implemented at different times.

Also as compared to a conventional ASIC-based controller, the controller of these embodiments can require less power consumption and less firmware overhead. In an instant, the entire programmable hardware logic can be switched off, leaving only the ASIC part active, to save power and allow the controller to operate in a low-power and low-performance mode. If high performance is required, the programmable logic can be configured accordingly. Also, the programmable logic can be configured to provide stimulus to the ASIC part to debug the logic in the ASIC.

Further, the programmable nature of the controller makes it easy to fix bugs and to update the controller after product release. For example, the controller can be updated with the latest LDPC after the release of product and whenever new memory technology is available.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A memory controller, comprising:
   a memory interface;
   a host interface; and
   a processor configured to read a configuration file from a storage location external to the memory controller and to perform one or both of the following:
      write values from the configuration file into a register in the memory interface to dynamically configure the memory interface to work with different types of memories; and
      write values from the configuration file into a register in the host interface to dynamically configure the host interface to work with different types of hosts.

2. The memory controller of claim 1, further comprising an error detection/correction module, wherein the processor is further configured to write values from the configuration file into a register in the error correction detection/correction module to dynamically configure the error detection/correction module with different error detection/correction functionality.

3. The memory controller of claim 1, further comprising a clock management module, wherein the processor is further configured to write values from the configuration file into a register in the clock management module to dynamically configure the clock management module with generate different clock frequencies.

4. The memory controller of claim 1, wherein the memory interface is dynamically configured to work with different types of memories by selecting a number of memory interface channels.

5. The memory controller of claim 1, wherein the processor is part of an application-specific integrated circuit (ASIC), and wherein the memory interface and the host interface are not part of the ASIC.

6. The memory controller of claim 5, wherein the ASIC further comprises one or more of the following: a multi-layer matrix (MLM) interconnect; an MLM interconnect bus interface; a peripheral, debug, and trace interface; a security and electrical fuse module; and a set of analog components.

7. The memory controller of claim 5, further comprising a second processor that is not part of the ASIC, wherein the second processor is configured for load sharing with the processor in the ASIC.

8. In a memory controller that has a memory interface, a host interface, and a processor, a method comprising:
   reading values from a memory in a storage system; and
   performing one or both of the following:
      programming the memory interface with the values to dynamically configure the memory interface to work with a selected one of different types of memories; and
      programming the host interface with the values to dynamically configure the host interface to work with a selected one of different types of hosts.

9. The method of claim 8, further comprising configuring an analog component in the controller with a selected clock frequency specified by the values.

10. The method of claim 8, further comprising, prior to reading the values:
    starting a boot-up process; and
    programming the memory interface to be able to read the memory.

11. The method of claim 10, further comprising, after programming the memory interface and/or host interface, loading firmware and completing the boot-up process.

12. The method of claim 8, further comprising using a second processor in the controller for load sharing with the processor.

13. The method of claim 8, further comprising programming an error detection/correction module with the values to enable the error detection/correction module to operate with selected parameters.

14. The method of claim 8, wherein the processor is part of an application-specific integrated circuit (ASIC), and wherein the memory interface and the host interface are not part of the ASIC.

15. The method of claim 14, wherein the ASIC further comprises one or more of the following: a multi-layer matrix (MLM) interconnect; an MLM interconnect bus interface; a peripheral, debug, and trace interface; a security and electrical fuse module; and a set of analog components.

16. The method of claim 8, wherein the memory comprises a three-dimensional memory.

17. A memory controller, comprising:
    an application-specific integrated circuit (ASIC);
    a plurality of dynamically-programmable components located external to the ASIC; and
    means for programming the dynamically-programmable components to enable to memory controller to interface with a selected memory type and/or a selected host type.

18. The memory controller of claim 17, further comprising means for programming the dynamically-programmable components to configure the memory controller with selected error detection/correction functionality.

19. The memory controller of claim 17, wherein the ASIC comprises one or more of the following: a processor, a multi-layer matrix (MLM) interconnect, a MLM interconnect bus interface, random access memory, a memory interface, a peripheral, debug, and trace interface, a security fuse, and an analog component.

20. The memory controller of claim 17, wherein the plurality of dynamically-programmable components comprise one or more of the following: a host interface module, a memory interface multiplexor and channel selector, a multi-layer matrix (MLM) interconnect, a clock management module, and error correction/detection circuitry.

* * * * *